(12) United States Patent
Pepper et al.

(10) Patent No.: US 7,724,994 B1
(45) Date of Patent: May 25, 2010

(54) DIGITALLY CONTROLLED OPTICAL TAPPED TIME DELAY MODULES AND ARRAYS

(75) Inventors: David M. Pepper, Malibu, CA (US); David Sumida, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 299 days.

(21) Appl. No.: 12/025,643

(22) Filed: Feb. 4, 2008

(51) Int. Cl.
  G02B 6/26 (2006.01)
  G02B 6/42 (2006.01)
  H04J 14/08 (2006.01)
(52) U.S. Cl. .................. 385/27; 385/15; 385/39; 385/40; 385/48; 398/102; 342/375
(58) Field of Classification Search .......... 385/15, 385/24, 27, 39, 40, 48; 398/52, 53, 102; 342/368, 375
See application file for complete search history.

(56) References Cited

U.S. PATENT DOCUMENTS

| | | |
|---|---|---|
| 4,088,969 A | 5/1978 | Crowley et al. |
| 4,736,463 A | 4/1988 | Chavez |
| 4,813,766 A | 3/1989 | Keene et al. |
| 4,939,527 A | 7/1990 | Lamberty et al. |
| 5,051,754 A | 9/1991 | Newberg |
| 5,061,048 A | 10/1991 | Hayden et al. |
| 5,103,495 A | 4/1992 | Goutzoulis |
| 5,117,239 A | 5/1992 | Riza |
| 5,202,776 A | 4/1993 | Gesell et al. |
| 5,272,484 A | 12/1993 | Labaar |
| 5,455,878 A | 10/1995 | Thaniyavarn |
| 5,461,687 A | 10/1995 | Brock et al. |
| 5,512,907 A | 4/1996 | Riza |
| 5,526,170 A | 6/1996 | Esman et al. |
| 5,543,805 A | 8/1996 | Thaniyavarn |
| 5,583,516 A | 12/1996 | Lembo |
| 5,623,360 A | 4/1997 | Gesell et al. |
| 5,641,954 A | 6/1997 | Keefer et al. |
| 5,694,134 A | 12/1997 | Barnes |
| 6,128,421 A | 10/2000 | Roberts |
| 6,144,786 A | 11/2000 | Chethik |
| 6,157,475 A | 12/2000 | Dugan et al. |
| 6,310,831 B1 | 10/2001 | Dillman |
| 6,351,587 B1 | 2/2002 | Holland |

(Continued)

FOREIGN PATENT DOCUMENTS

WO  00/43828  7/2000

OTHER PUBLICATIONS

Benjamin, R., et al., "Optical Beam forming technique antennas," IEEE Proceedings-H, vol. 139, No. 6, Dec. 1992, pp. 526-584.

(Continued)

*Primary Examiner*—Daniel Petkovsek
(74) *Attorney, Agent, or Firm*—Ladas & Parry

(57) ABSTRACT

An optical time delay module has a plurality of time delay elements connected in a series and a plurality an optical output couplers wherein each of said optical output couplers is operationally connected between one or more time delay elements in said series, the optical output couplers providing a plurality of optical outputs from said module with different optical delays controlled by a digital control word.

6 Claims, 3 Drawing Sheets

U.S. PATENT DOCUMENTS

| | | | |
|---|---|---|---|
| 6,356,677 | B1 | 3/2002 | Hall et al. |
| 6,393,177 | B2 | 5/2002 | Paek |
| 6,674,930 | B2 | 1/2004 | Hall et al. |
| 6,760,512 | B2 | 7/2004 | Pepper |
| 6,891,987 | B2 | 5/2005 | Ionov et al. |
| 7,283,708 | B2 * | 10/2007 | Efimov .................. 385/39 |
| 2002/0054726 | A1 | 5/2002 | Fondeur et al. |
| 2002/0181874 | A1 | 12/2002 | Tulchinsky et al. |
| 2003/0002773 | A1 | 1/2003 | Parker et al. |

OTHER PUBLICATIONS

Nguyen et al., "Pencil-beam full-space scanning 2D CRLH leaky-wave antenna array," International Symposium on Signals, Systems, and Electronics, pp. 139-142, Jul. 30, 2007.

Chen et al., "Photonic true time delay module for high frequency broad band phase array antenna," Proceedings of SPIE, vol. 4292, May 30, 2001.

Fu, Z., et al., "Five-bit substrate guided wave true-time delay module working up to 2.4 Thz with a packing density of 2.5 lines/$cm^2$ for phased array antenna applications," *Optical Engineering*, vol. 37, No. 6, pp. 1838-1844 (1998).

Tang, S., "Polymer-Based Optical Waveguide Circuits for Photonic Pahased Array Antennas," SPIE Conference on Optoelectronic Interconnects VI, SPIE vol. 3632(1999).

Yamaguchi, M., et al., "Variable optical delay line based on a birefringent planar optical platform," Optical Society of America (1995).

Yin. S., "Lithium Niobate fibers and Waveguides: Fabrications and Applications," Proceedings of the IEEE. vol. 87, No. 11 (Nov. 1999).

\* cited by examiner

DIGITALLY CONTROLLED OPTICAL TAPPED TIME DELAY MODULES AND ARRAYS

STATEMENT REGARDING FEDERAL FUNDING

This invention was made under U.S. Government contract STAB DAAB07-01-C-K802. The U.S. Government has certain rights in this invention.

CROSS REFERENCE TO RELATED PATENT AND PATENT APPLICATIONS

This application is related to the disclosure of U.S. Pat. No. 6,760,512 by David M. Pepper, the disclosure of which is hereby incorporated herein by reference.

This application is also related to U.S. patent application Ser. No. 12/025,647 filed on the same date as this application, entitled "Two-dimensional Optical True Time Delay Method" which is assigned to the same assignee as the present application, the disclosure of which is hereby incorporated herein by reference.

TECHNICAL FIELD

Optical beam control is often required where information from an optical beam must be relayed from one location to another. High-bandwidth, secure laser communication (e.g. pulse-burst encoding, pulse position modulation, etc.), infrared countermeasures (IRCM), target designation, bio/chem beam steering and laser radar are a few of the applications in which optical beam control is required. Optical beam control of pulsed optical beams requires that the control device provide time-coincident generation of the desired pulse format across the entire aperture of the control device.

Devices for steering optical beams are well known in the art. Optical beam steering can be implemented with electro-mechanical systems. Such systems generally consist of a mirror mounted on an electrical actuator. These systems provide relatively low losses for the strength of the reflected beam. However, such electro-mechanical systems are limited to low response frequencies up to the order of 1 KHz. The moving parts of an electro-mechanical system along with size and weight factors are considered to be major limitations of such a system.

Smaller and lighter optical beam steerers are provided by compact arrays of non-mechanical beam deflectors, such as optical MEMS mirrors (O-MEMS) or liquid crystal arrays. The optical signal provided to these devices is generally split into multiple optical signals. The arrays then actually consist of multiple optical radiators which act to steer and radiate multiple optical signals in a desired direction. However, since the radiators are generally deployed in a relatively flat plane, the output beams do not arrive at a receive point at the same time. This problem is particularly seen when the optical signal comprises pulsed signals. In this case, the optical pulse received from the radiating element furthest from the receive point will lag the pulse received from the closest radiating element. This problem is further exacerbated when the pulse widths (or the time slots for encoding) are shorter than the photon transit time across the radiating aperture. Performance of the optical transmitting system is improved when the individual optical beams are made time-coincident to create a time-coincident optical beam.

Applying a time delay to each optical beam before it is radiated provides the capability to generate a time-coincident optical beam. Controlling the delay of signals from individual transmitting elements is actually the principle behind a beam-steered phased array antenna system. Phased array antenna systems employ a plurality of individual antenna elements that are separately excited to cumulatively produce a transmitted electromagnetic wave that is highly directional. In a phased array, the relative phases of the signals provided to the individual elements of the array are controlled to produce an equiphase beam front in the desired pointing direction of the antenna beam. The premise of a true-time delay beamsteered phased array is to steer the array beam by introducing known time delays into the signals transmitted by the individual antenna elements. Accurate beam steering of a pulsed optical beam from individual optical elements similarly requires introducing time delays into the optical signals from individual optical elements to produce an equiphase optical beam front.

Optical control systems for producing selected time delays in signals for phased array antennas are well known in the art. Different types of optical architectures have been proposed to process optical signals to generate selected delays, such as routing the optical signals through optical fiber segments of different lengths; using deformable mirrors to physically change the distance light travels along a reflected path before transmission; and utilizing free space propagation based delay lines, which architecture typically incorporates polarizing beam splitters and prisms. These techniques can also be used for optical beam steering, with various levels of success.

The use of optical fiber segments to introduce delays requires the use of many optical switches and the splicing together of numerous segments of fiber. The costs of construction of such a device are substantial, given the significant amount of design work and precision assembly work required to produce a device having the range and incremental steps of time delays necessary to provide the desired steering. The numerous switching and coupling elements also introduce very high optical losses in the beamforming circuitry, requiring significant optical power.

The deformable mirror system relies on the physical displacement of a mirror to provide the necessary time delay; an array of moveable mirrors allows the generation of a range of delayed optical signals. This type of system introduces additional complexity into an optical beam steering system due to the tight tolerances and small time delays required for optical signals.

An optical architecture for time delay beamforming using free space elements is disclosed by Riza in U.S. Pat. No. 5,117,239, "Reversible Time Delay Beamforming Optical Architecture for Phased-Array Antenna," dated May 26, 1992. In Riza, input optical beams are directed through a plurality of free space delay devices which selectively delay the beams. The delay imparted to an individual beam is selected by a plurality of spatial light modulators coupled with polarizing beam splitters which will either pass a light beam or direct the light beam into a delay device. This architecture also requires a large number of individual delay devices, which increases the complexity and cost of the system.

An optical true-time delay bulk structure is disclosed by Zhenhai Fu and Ray T. Chen in "Five-bit substrate guided wave true-time delay module working up to 2.4 THz with a packing density of 2.5 lines/cm$^2$ for phased array antenna applications," Optical Engineering, Vol. 37, No. 6, June 1998, pp. 1838-1844. The bulk substrate disclosed by Fu and Chen comprises a passive waveguide that takes as an input an optical pulse and generates a sequence of output pulses with fixed delays. In this prior art, the passive substrate is used to provide delays to an optical signal and a photonic switching network is used to select a given set of taps. Holographic gratings are used to provide the output taps along the delay line. To assure that each tap has the same optical output power, the diffraction efficiency of the gratings is designed to increase along the delay line, as the successive taps couple the light out. Since the waveguide is passive, i.e., no external control is used to modify the delay provided by the waveguide, and, further, the tapped output locations are fixed, the output sequence of optical pulses is fixed in a temporal sense and cannot be changed. The device disclosed by Fu and Chen is directed to optically controlling an RF pulse-forming network with a fixed set of time delays.

Based on the foregoing it was believed to be desirable to provide a mechanism for producing variable true time delay in an optical signal without requiring active switching and without high insertion loss. A one dimensional solution is presented in U.S. Pat. No. 6,760,512 by David M. Pepper, noted above, which is mechanism would allows for precision optical beam steering.

The related U.S. patent application Ser. No. 12/025,647, filed on the same date as this application and entitled "Two-dimensional Optical True Time Delay Method" relates to the use of a multiplicity of tapped optical delay lines as a means to generate a programmable optical true-time delay (TTD) network over a two dimensional (2-D) array for a planar beam-steering aperture using only two independent control signals. The set of tapped outputs provides a corresponding set of subapertures through which each output optical pulse emerges, with increasing delayed outputs along each tapped line (assuming an input optical pulse at one end of the line) for a two-dimensional N×M array addressed by two (2) independent TTD controls signals. The term 'subaperture' refers to individual pixelated apertures within an overall aperture. Depending on the specific aperture hardware embodiment, the subapertures may be actually pixelated (i.e. discrete individual 'mini' apertures) or they may be only connected on a subaperture basis but really are part of one contiguous large monolithic aperture).

The technology disclosed therein provides a means of simple control of a large arbitrary number subapertures configured as a of 2-D set tapped arrays, so that only two independent control parameters are required to result in a set of linear, programmable time delays for all subapertures in the 2-D array. This dramatically reduces the required number of control parameters from N×M controls to only two control parameters.

This application describes a number of specific embodiments for tapped delay lines which may be used in the application described in the aforementioned US Patent Application, but they may be used in other applications as well. The described tapped delay lines are programmable and can be reconfigured rapidly (≈1 msec or less), which is suitable for most laser communication scenarios.

The described delay lines may be used to provide a set of optical delays that drive a planar array (1-D or 2-D) of beam-steering elements. The composite system may be used, for example, for beam steering of high-bandwidth information in an optical communication system, which replaces traditional large mechanically driven gimbal mirrors with compact, planar arrays of optical MEMS, liquid crystal, or other planar non-gimbal beam-steerers. The TTD network is required to assure simultaneous arrival of a set of short optical pulse outputs from an array of sub-apertures to a given target, across a large field of view (≈45°).

This invention is useful in a variety of free-space laser communication systems, flash ladar, range finding, pulsed laser metrology, remote sensing and other high-bandwidth optical systems.

This invention improves on the prior art in programmable optical delay line technology.

INTRODUCTION TO THE DETAILED
DESCRIPTION OF PREFERRED
EMBODIMENTS

A digital linear tapped time delay unit or module is disclosed which may be used with the method disclosed in our related U.S. patent application Ser. No. 12/025,647 filed on the same date as this application, entitled "Two-dimensional Optical True Time Delay Method". In the disclosed embodiment, two control parameters can control the time delay associated with a 2-D array of linear tapped time delay units. The reader is referred to this related application for a discussion of how to determine the value of the two control parameters $\Delta y$ and $\Delta x$ used to control a 2-D array of optical apertures.

With the disclosed digital linear tapped time delay unit or module a single binary word (1s and 0s) controls an ensemble of identical digitized true-time delays modules. Since only two control parameters are required for two-dimensional beam steering (as previously noted above), only two binary words are required. In this case, the amount of time delay (in each dimension) is digitized, since a binary bit stream is used as the control setting.

The module can be a photonic chip, with optical waveguides, diffraction gratings, optical switching networks, and waveguide couplers all being preferably integrated into a single photonic chip or, alternatively, an ensemble of identical photonic chips.

Optical gain can be integrated into the photonic chip via optical pumping of gain regions in either the guiding structure or in the substrate. Waveguide and coupler optical losses can be compensated for, if need be.

While these initial embodiments may be particularly useful in connection with the method described in our related US patent application, these embodiments will doubtlessly find use in other applications and indeed we describe still further embodiments which are useful in applications other than the two-dimensional optical beam steering of our related US patent application identified above.

There are myriad applications for this technology. We describe the use of this technology as a means to provide a set of tapped optical delay lines 25, with application to high-bandwidth optical beam steering for laser communication systems over a free-space propagation path using a true-time delay (TTD) approach with the programmability in the US patent application identified above.

Digitally Controlled Tapped Optical Time Delay Module

Figure 1A:
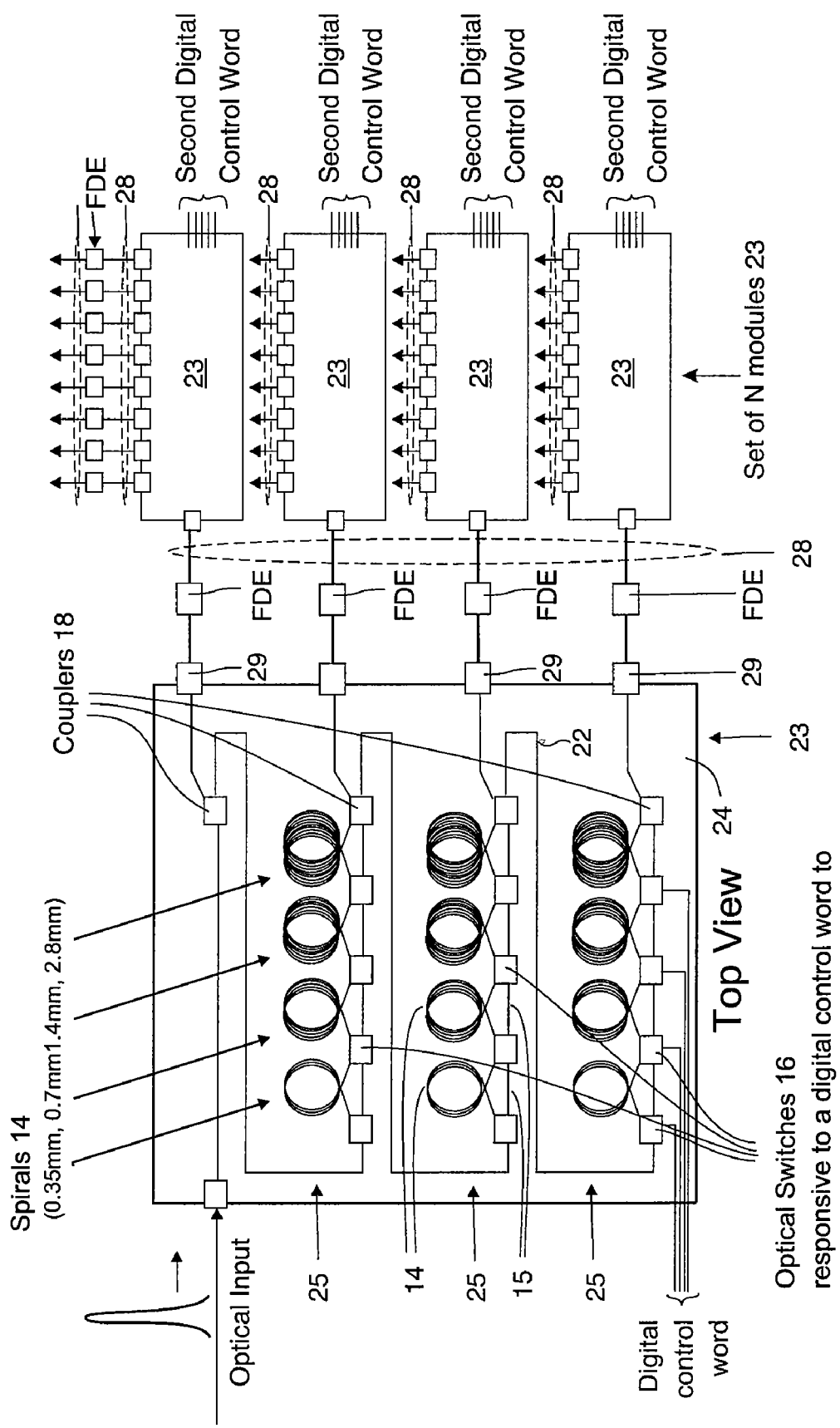
FIG. 1a depicts a digitized embodiment of tapped time delay module which may be used, for example, in a 2-D beam steerer controlled by two control parameters (two digital words); in this embodiment four channels (rows) are shown for the tapped time delay module 23 depicted in detail, but the number of channels (rows) may be adjusted as needed.

FIG. 1a depicts an optical tapped delay line module 23 which is shown with identical rows (or channels) 25 of optical delay elements 14 disposed on a preferably planar substrate 24, the optical delay elements 14 being switched in or out of an optical waveguide circuit 22 according to a digital control word (a digital word of 1s and 0s) applied to optical switches 16 connecting a series of increasing delay lines 14 in each row or channel 25. For ease of illustration, the digital control word is only shown as being applied to the optical switches 16 in the lower row 25 of delay elements 14, but the same digital control word would preferably be applied in parallel to the optical switches 16 in each row 25 of module 23. When switched "in", the optical signal passes through a following delay element 14. When switched "out", the optical signal takes a short cut via a bypass optical channel 15. A first bit of the digital control word may control the first optical switch 16 in each row 25, while a second bit of the digital control word may control the second optical switch 16 in each row 25, and so on. A row 25 may be referred to as a delay channel or unit 25 and each of the series of increasing delay lines or elements 14 are switched in or out of the row 25 of delay lines according to a corresponding bit of the digital word applied to each optical switch 16 in a given row 25. This delay channel 25 is preferably replicated M times in module 23, resulting in M rows 25 in a module (in this embodiment only three rows are shown for ease of illustration, but those skilled in the art can easily expand this module 23 beyond the three rows 25 depicted). Similarly, the number of bits in the control word can certainly be much greater than four, so the number of delay elements 14 and associated optical switches 16 in each row may well be much greater than four. Also, the optical output 29 shown at the top of FIG. 1a couples the optical input signal received at the optical input without any intentionally added delay (beyond the optical delay inherent in the fact that light must travel from the input to the output at the top of this figure). While such a "zero" time delay channel is shown in this embodiment, in need not necessarily be used in other embodiments.

So there are M output ports 29 for this module 23. Additional downstream modules 23 (which may have the same number or a differing number of output ports 29) may have their optical inputs connected to the output ports 29 of the module 23 shown in detail in this figure to form a two-dimensional output (comprising the outputs 29 of the downstream modules 23) of an entire true time delay system as discussed in the related US patent application identified above. The additional downstream modules 23 are shown in boxes in this figure, but are shown in greater detail in FIG. 1b.

The number of delay line elements 14 in each row 25 depends on the number of bits in the digital control word. The same value of the digital word is applied to each row 25 in the left hand module 23 (shown in detail in FIG. 1a) when used in connection with the true time optical delay method described in the related US patent application and typically a different (second) digital control word is then applied to all of the downstream modules 23 shown in the right hand side of FIG. 1a (an exemplary one of which modules 23 is shown in greater detail in FIG. 1b). However, there is no hardware restriction on having a different digital control word control each row 25 of delay lines if that is useful in embodiments other than those described in the related US patent application noted above, for example. The aforementioned $\Delta x$ control parameter may be used as the digital control word for the module 23 shown on the left hand side of FIG. 1a while the $\Delta y$ control parameter may be used as the digital control word for the downstream modules 23 shown on the right hand side of FIG. 1a and also in FIG. 1b.

As is explained in greater detail in the related US Patent Application identified above, in order to accommodate negative angles, a fixed amount of time delay may be added to each row 25. The additional fixed time delay is represented by the boxes labeled FDE (fixed delay element) in FIG. 1a. Since fixed time delay may be useful in two different dimensions, FDEs are shown between the upstream module 23 and one of its downstream modules 23 (although if one downstream module 23 had associated FDEs, then typically each downstream modules 23 would have associated FDEs.

Figure 1B:
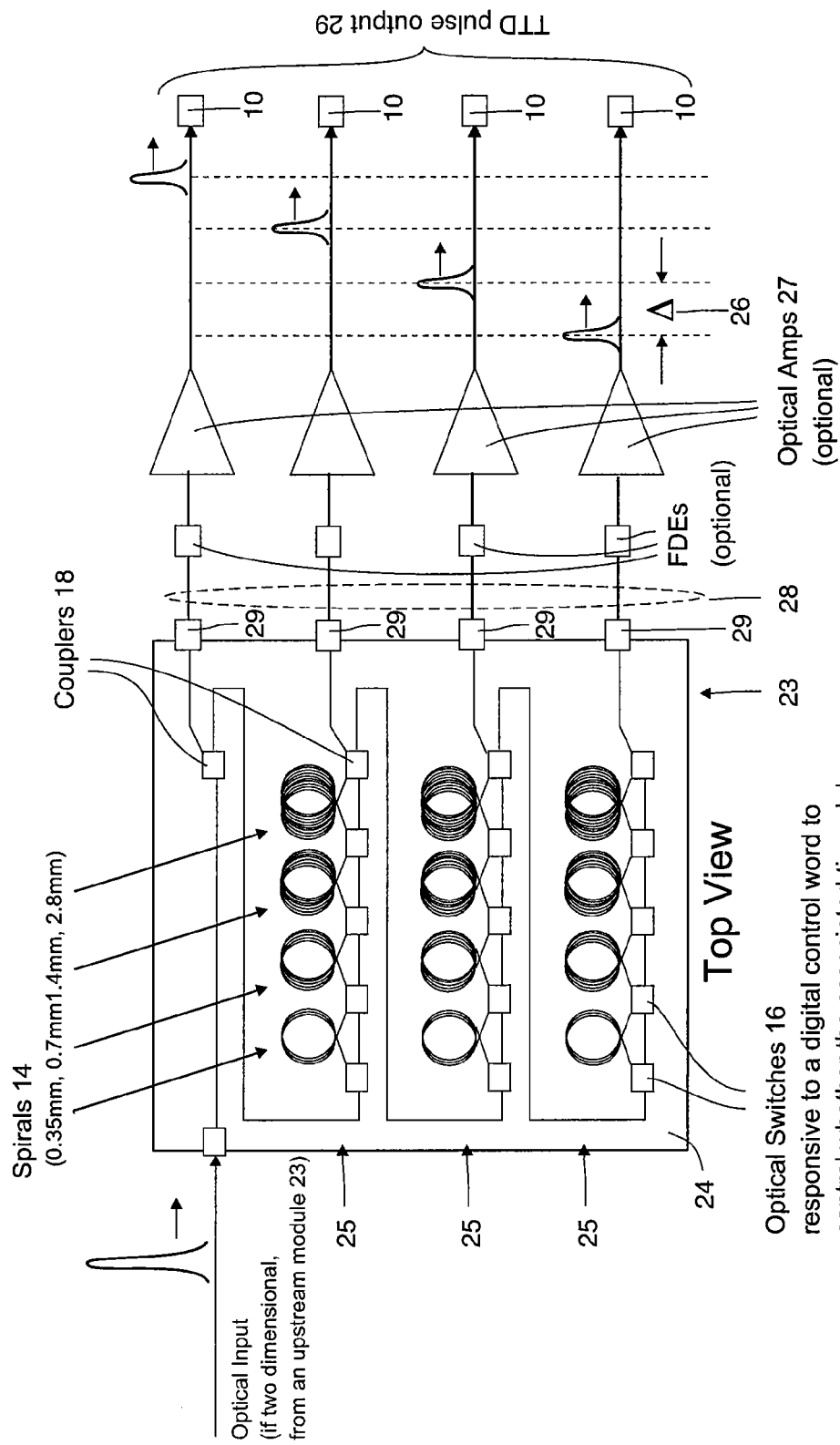
FIG. 1b depicts a digitized embodiment of a downstream tapped time delay module shown in box diagram form in FIG. 1a; in this embodiment four channels are shown for the module 23 depicted in detail, but the number of channels (rows) may be adjusted as needed. Indeed, when shown in block diagram form in FIG. 1a, the downstream modules 23 have eight outputs 28 and hence eight internal channels or rows, but only four channels or rows are shown in this figure, as the number of channels or rows is a design choice and can be easily modified according to the teachings herein.

Within a given row (delay channel) 25, each successive delay element 14 (shown as optical fiber spirals in FIGS. 1a and 1b but any suitable optical delay device could be used) is a multiple of two times greater delay than the respective previous delay element 14. Each delay element 14 may comprise a number of loops of optic fiber, with the number of loops increasing as the delay increases. The binary control word controls a set of optical switches 16, so that the total delay along a given channel 25 is the sum of each set of binary delay elements 14 (if one ignores the relatively small delay occurring in the optical bypasses 15 and in the switches 16 themselves). This total delay, along a given horizontal row, forms one of a series of preferably identical delay amounts for each row 25 of a module 23. At the terminus of each row, an output coupler 18 enables a fraction of the light to exit that given row 25 via the optical output 29, while directing the remainder of the light into the next successive delay channel or row 25. Hence, the net optical output of this module is a series outputs 29 with ever increasing identical delays 26 (the optical delays are depicted in FIG. 1b, but optical delays occur in a similar fashion for the module 23 shown in FIG. 1a as well). Each of these delayed output channels is preferably (i) coupled to another downstream module 23 as shown in FIG. 1a to form a two dimensional array of outputs or (ii) is coupled into a subaperture, preferably via an optical amplifier 27, of the composite output beam as shown in FIG. 1b and as described in the related application identified above if the module 23 is one of the downstream modules 23 shown on the right hand side of FIG. 1a. The spiral length values shown in FIGS. 1a and 1b (i.e. 0.35 mm, 0.7 mm, etc.) for the optical delay device spirals 17 are adjusted according to the temporal resolution required in a particular application.

One such module 23 (consisting of M output channels) may be used to control a set of identical delays in one dimension as described in the related US patent application identified above. Each of the M output ports 29 is then coupled into a set of N parallel modules 23 as shown to the right hand side of FIG. 1a. The set of N modules 23, each row 25 of which is driven by another (or second) binary word, controls the set of identical delays in an orthogonal direction as also described in the related US patent application identified above. The composite set of these M×N channels forms the overall ensemble of two-dimensional subapertures 10, resulting in the final azimuthal-elevation ("az-el") angular output optical beam emanating into free space or the atmosphere depending upon where the overall ensemble of two-dimensional subapertures 10 is disposed.

Only two digital words ($\Delta x$ and $\Delta y$) need be utilized, one for the delays in a first direction (one dimension) and the other for delays in the second direction (the orthogonal direction). So the Δx control word may control the each of the rows 25 in module 23 shown in the left half portion of FIG. 1a while the Δy control word may each of the rows in the set of N modules 23 shown on the right half portion of FIG. 1a. The modules 23 shown on the right hand portion of FIG. 1a have outputs 28 which can be coupled via optional fixed time delay elements (FDEs) to optional optical amplifiers 27 as shown by FIG. 1b which depicts a module 23 coupled to at its row 25 outputs 28 to optical amplifiers 27. Optional FDEs are also depicted in FIG. 1b. The number of rows per module and the number of time delay elements per row may well be different (or the same) for the module on the left hand side of FIG. 1a compared to the set of modules 23 should on the right hand side of FIG. 1a. As is described in the related application identified above, FDEs may be useful in connection with certain methods described therein.

Preferably, for a given required temporal resolution (as determined by the data rate, etc.), the values for the two control parameters Δx and Δy for a given resolvable azimuthal-elevation angle may be stored in an associated memory module (e.g., EPROM, static RAM, file on a hard disk, etc.) for rapid downloading and control of the pair of required time-delays of the N×M array 20 of subapertures 10. The control of the temporal delays (one value for each orthogonal coordinate) can be achieved using a digitized control module. In that case, a binary digital word is applied to the delay module (such as in the embodiment of FIG. 1a). This digital word determines the magnitude of the temporal delay for that given orthogonal dimension (say, the azimuth). Another (second) digital word (applied to the module 23 shown in FIG. 1b) controls the temporal delay in the orthogonal dimension (say, the elevation). The number of bits in each digital word determines the temporal resolution of the system, which can, in general, be different for each orthogonal dimension.

FIG. 2

Figure 2:
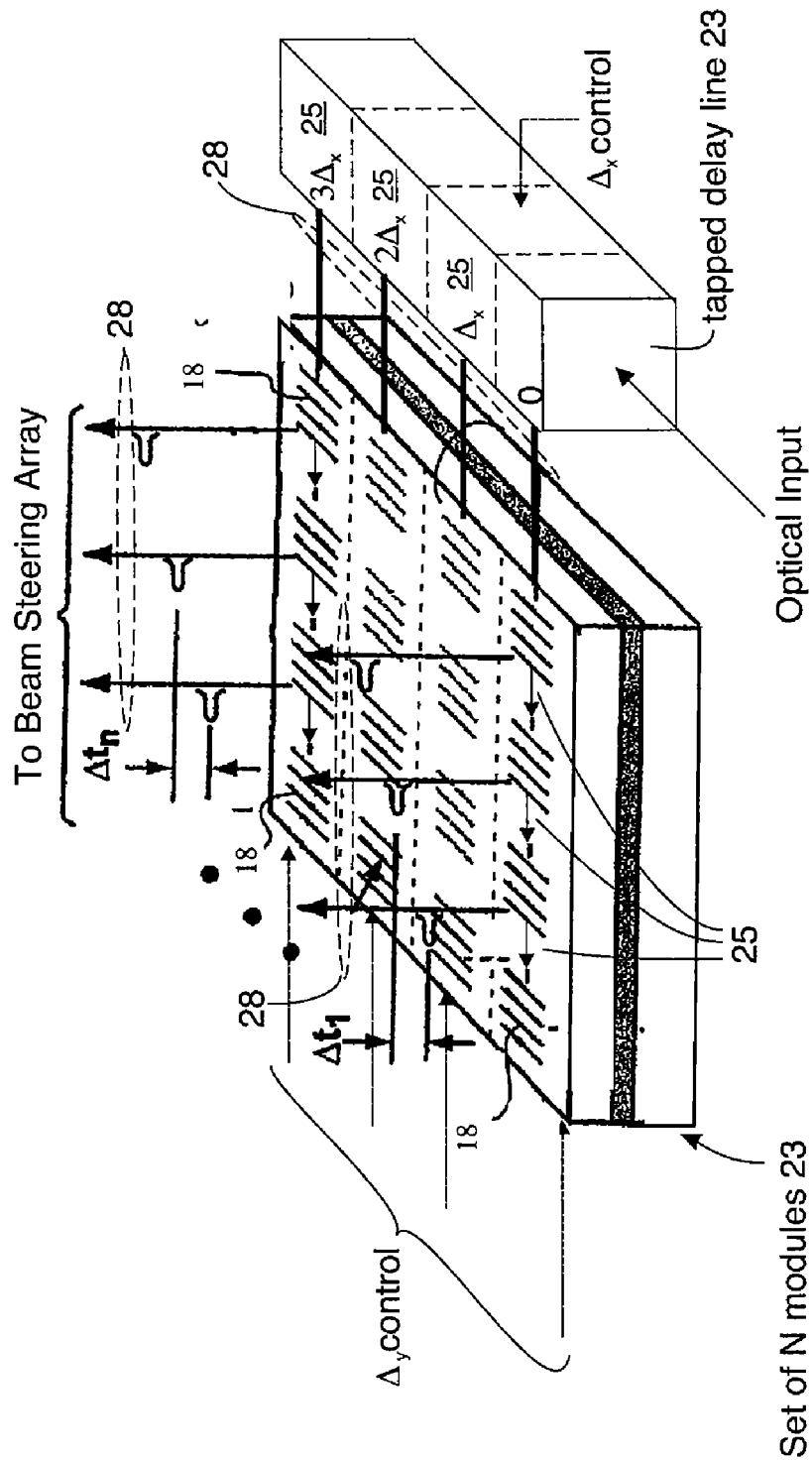
FIG. 2 shows a two dimensional arrangement of delay line modules of the types described herein forming a 2-D true time delay aperture for a communication system, for example.

FIG. 2 shows a two-dimensional arrangement of the 2-D TTD device, based on the system depicted in FIGS. 1a and 1b. In this embodiment, a 2-dimensional planar waveguide structure is employed to generate a set of N×M programmable TTDs, in a parallel arrangement, and all propagating in a vertical direction to a beam-steering array module. This entire planar structure is in the form of a set of N parallel waveguide regions 23 with incremental delay lines 25 and intervening grating output couplers 18. In this embodiment, an x-tapped delay line 23 is shown on the right-hand side of the figure, with a single optical input data stream, as shown. The binary control word $\Delta_x$ is applied identically, to each programmable delay line 25 that forms the tapped delay line 23 responsive to the binary control word $\Delta_x$. Each of the N tapped output beams 28, successively delayed by the same differential delay binary control word $\Delta_x$, is coupled into a corresponding y-tapped delay-line module 23 in the aforementioned 2-dimensional planar waveguide structure. A common binary control word $\Delta_y$ is applied to all delay modules 25 in each tapped delay module 23 making up the 2-dimensional planar waveguide structure or ensemble. The ensemble consists of N identical y-tapped delay lines 23 all fabricated on a planar 2-dimensional waveguide structure. Each of the N y-tapped delay lines 23 consists of a set of programmable incremental delay elements 25, of which there are M such tapped outputs along a given y-tapped delay line. The composite waveguide structure thus consists of an array of N×M total tapped and delayed output beams 28, which are preferably directed in a vertical direction, emanating out from the major plane of the structure, and directed to a beam steering array.

In this embodiment, the guided beam along each y-tapped delay line in the 2-D ensemble encounters a set of grating output couplers 18, each with a progressively increasing fractional output ratio, and a corresponding decreasing fractional transmitted ratio as the latter beam continues to propagate along the remainder of the given y-tapped delay line. That is, the set of gratings along a given y-tapped delay line 23 may be configured such that the diffraction efficiency of the gratings 18 increases from the input end of the line of gratings to the terminus end. The stream of incident optical pulses from the x-tapped delay line is coupled to a TTD region of the waveguiding structure associated with a line of output gratings. The gratings 18 are configured so that all out-coupled beams 28 emerge normal to the planar structure, in a vertical direction.

Optional fixed delay elements (labeled as FDE in FIGS. 1a and 1b) are not shown in FIG. 2 for ease of viewing, but, in general, are positioned along interconnecting beams 28 that couple the $\Delta_x$ controlled TTD module 23 to the 2-D array of $\Delta_y$ controlled TTD modules 23, and, additionally, along each of the N×M output beams that emerge orthogonally from the 2-D planar waveguide structure. Also not shown are optional optical amplifiers (see numeral 27 in FIG. 1b). These optional amplifiers can be incorporated along each of the N×M output beams as in FIG. 1b, or, can be integrated into the 2-D N×M planar waveguide structure of $\Delta_x$ controlled time delay modules 23 and gratings 18. In the latter case, optical amplification can be integrated into the substrate, guiding layers and/or the waveguide channels of the 2-D N×M grating/waveguide structure. Myriad optical amplification techniques can be employed such as optically pumped rare-earth doped waveguide materials, as well as electrically pumped semiconductor-based waveguide materials. In the case of hybrid TTD and amplification, the fractional beam-coupling ratios of the grating couplers need to be modified so that each of the N×M amplifier section achieves gain saturation, at least for temporally encoded pulse-formatted data streams.

In FIG. 2, note that the input beam from the modulated source is incident to the TTD system from the right-hand guided region of the $\Delta_x$ controlled TTD module 23, whereas the ensemble of time-delayed output beams emerge from the top surface of the planar waveguide $\Delta_y$ controlled TTD modules 23, which are subsequently directed to the beam steering module. Prisms, gratings, or other means known in the art may provide for coupling of the $\Delta_x$ controlled TTD N-output beams into the 2-D array of $\Delta_y$ controlled TTD modules 23, as well as the $\Delta_x$ controlled TTD N×M output beams. This TTD modular configuration is amenable to a stacked three-dimensional optical interconnection architecture for the entire system. Having described this invention in connection with several embodiments and applications of same, further embodiments and/or applications will doubtlessly suggest themselves to those skilled in the art. As such the invention is not to be limited to the disclosed embodiments or to the disclosed applications for using same unless specifically required by the appended claims.

The invention claimed is:

1. An optical time delay module comprising:
   a. a plurality of rows of time delay elements connected in a series, an initial time delay element in an initial row in said series being responsive to an optical input to said module;
   b. a plurality of optical output couplers wherein each of said optical output couplers is operationally connected between each row of time delay elements in said series, the optical output couplers providing a plurality of optical outputs from said module with different optical delays controlled by a digital control word;

c. wherein each row of time delay elements has a plurality of time delay elements coupled in series via optical switches, each time delay element having an associated optical bypass arranged so that an optical switch connected immediately upstream of one of the time delay elements and its associated optical bypass controls whether light passing via the switch is conveyed via said one of the time delay elements or its associated optical bypass;

d. the optical switches being controlled to switch an output thereof onto either a following time delay element or following bypass by a bit of said digital control word.

2. An optical time delay module according to claim 1 further including another optical output coupler connected upstream of initial said time delay element in said initial row in said series, the another optical output coupler providing an additional optical output from said module which is not affected by said digital control word.

3. An optical time delay module according to claim 1 wherein the number of optical switches in each row of time delay elements corresponds to the number of bits in said digital control word.

4. An optical time delay module according to claim 3 wherein the optical switches in each row of time delay elements are controlled in common by said digital control word so that a single, common digital control word is applied to the optical switches in each row of time delay elements in said module whereby the amount of delay imposed on the optical signal in each row of time delay elements is a function of the state of the digital control word.

5. The optical time delay module of claim 1 wherein each time delay element is formed by a optical fiber spiral.

6. An two dimensional programmable time delay optical array comprising:

a plurality of elongate optical time delay modules arranged in parallel to each other in a two dimensional array wherein each time optical delay module in said two dimensional array includes:

a. a plurality of rows of time delay elements connected in a series, an initial time delay element in an initial row in said series being responsive to an optical input to said module;

b. a plurality an optical output couplers wherein each of said optical output couplers is operationally connected between each row of time delay elements in said series, the optical output couplers providing a plurality of optical outputs from said module with different optical delays controlled by a first digital control word;

c. wherein each row of time delay elements has a plurality of time delay elements coupled in series via optical switches, each time delay element having an associated optical bypass arranged so that an optical switch connected immediately upstream of one of the time delay elements and its associated optical bypass controls whether light passing via the switch is conveyed via said one of the time delay elements or its associated optical bypass;

d. the optical switches being controlled to switch an output thereof onto either a following time delay element or following bypass by a bit of said first digital control word;

and an additional time delay module having:

e. a plurality of rows of time delay elements connected in a series, an initial time delay element in an initial row in said series being responsive to an optical input to said additional time delay module;

f. a plurality an optical output couplers wherein each of said optical output couplers is operationally connected between each row of time delay elements in said series, the optical output couplers providing a plurality of optical outputs from said additional time delay module with different optical delays controlled by a second digital control word, wherein the optical outputs from said additional time delay module are each coupled to an optical input of the optical time delay modules forming said two dimensional array;

g. wherein each row of time delay elements has a plurality of time delay elements coupled in series via optical switches, each time delay element having an associated optical bypass arranged so that an optical switch connected immediately upstream of one of the time delay elements and its associated optical bypass controls whether light passing via the switch is conveyed via said one of the time delay elements or its associated optical bypass;

h. the optical switches being controlled to switch an output thereof onto either a following time delay element or following bypass by a bit of said second digital control word.

\* \* \* \* \*